US011470218B2

United States Patent
Horiguchi (10) Patent No.: US 11,470,218 B2
(45) Date of Patent: Oct. 11, 2022

(54) IMAGE READING DEVICE COMPRISING AN OUTER PERIPHERAL MEMBER INCLUDING TWO REFERENCE SURFACES ADJACENT IN THE SUB-SCANNING DIRECTION AND DIFFERING IN LIGHT REFLECTANCE

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/468,418

(22) Filed: Sep. 7, 2021

(65) Prior Publication Data
US 2022/0086300 A1  Mar. 17, 2022

(30) Foreign Application Priority Data
Sep. 16, 2020 (JP) .............. JP2020-155402

(51) Int. Cl.
| H04N 1/00 | (2006.01) |
| H04N 1/047 | (2006.01) |
| H04N 1/028 | (2006.01) |
| H04N 1/409 | (2006.01) |
| H04N 1/03 | (2006.01) |
| H04N 1/024 | (2006.01) |

(52) U.S. Cl.
CPC ....... *H04N 1/0473* (2013.01); *H04N 1/00748* (2013.01); *H04N 1/0288* (2013.01);
(Continued)

(58) Field of Classification Search
CPC ............. H04N 1/00748; H04N 1/0288; H04N 1/02895; H04N 1/03; H04N 1/0473;
(Continued)

(56) References Cited

U.S. PATENT DOCUMENTS

| 6,765,700 B1 * | 7/2004 | Naito ................. H04N 1/00816 |
| | | 358/406 |
| 7,688,477 B2 * | 3/2010 | Ikeno ................. H04N 1/00779 |
| | | 358/488 |

(Continued)

FOREIGN PATENT DOCUMENTS

| JP | 2001005119 A | 1/2001 |
| JP | 2002135540 A * | 5/2002 |

(Continued)

*Primary Examiner* — Chad Dickerson
(74) *Attorney, Agent, or Firm* — Alleman Hall Creasman & Tuttle LLP (57) ABSTRACT

An outer peripheral member disposed at an outer periphery of a platen glass includes first and second reference surfaces. The first reference surface is a lower surface of an area extending along a side edge portion of the platen glass at an end in a main scanning direction. The second reference surface is located adjacent to the first reference surface in a second direction and differs in light reflectance from the first reference surface. An image processing portion determines whether outer periphery pixel data of an outer periphery area in line image data acquired successively while a scanning unit is moving, satisfies a border condition. A unit driving portion positions the scanning unit to a home position by moving the scanning unit a predetermined distance from where the scanning unit is located when it is determined that the outer periphery pixel data satisfies the border condition, and stops it.

7 Claims, 6 Drawing Sheets

(52) U.S. Cl.
CPC ........... *H04N 1/02895* (2013.01); *H04N 1/03* (2013.01); *H04N 1/409* (2013.01)

(58) Field of Classification Search
CPC .... H04N 1/409; H04N 1/4175; H04N 1/4076; H04N 1/4078; H04N 1/00761; H04N 1/00045; H04N 1/6033
USPC ....... 358/461, 509, 504, 505, 449, 474, 486, 358/488
See application file for complete search history.

(56) References Cited

U.S. PATENT DOCUMENTS

| | | | |
|---|---|---|---|
| 7,843,609 B2 * | 11/2010 | Caster | H04N 1/00092 382/318 |
| 9,001,396 B2 * | 4/2015 | Kojo | H04N 1/02815 358/475 |
| 2002/0080427 A1 * | 6/2002 | Clifton | H04N 1/1013 358/504 |
| 2004/0263915 A1 * | 12/2004 | Park | H04N 1/4076 358/509 |

FOREIGN PATENT DOCUMENTS

| | | | |
|---|---|---|---|
| JP | 2004112300 A | * | 4/2004 |
| JP | 4110900 B2 | * | 7/2008 |
| JP | 2008271396 A | * | 11/2008 |

* cited by examiner

IMAGE READING DEVICE COMPRISING AN OUTER PERIPHERAL MEMBER INCLUDING TWO REFERENCE SURFACES ADJACENT IN THE SUB-SCANNING DIRECTION AND DIFFERING IN LIGHT REFLECTANCE

INCORPORATION BY REFERENCE

This application is based upon and claims the benefit of priority from the corresponding Japanese Patent Application No. 2020-155402 filed on Sep. 16, 2020, the entire contents of which are incorporated herein by reference.

BACKGROUND

The present disclosure relates to an image reading device for reading an image from a document sheet placed on a platen glass.

An image reading device may have a function to execute a static document sheet reading process. In the static document sheet reading process, an image is read from a document sheet placed on a platen glass. The static document sheet reading process is often called an image reading process of a flat bed system.

In the static document sheet reading process, a unit driving portion moves a scanning unit that includes a light emitting portion and a light guide member that are formed along a main scanning direction, from a predetermined home position to an area below the platen glass.

The image reading device further includes an image sensor, an AFE (Analog Front End), and a data processing portion. The image sensor receives light guided by the light guide member, and outputs a line image signal representing a light amount of the received light. The AFE converts the line image signal to digital line image data that includes a plurality of pieces of pixel data. The data processing portion processes the line image data.

It is noted that the scanning unit may include a contact image sensor unit. The contact image sensor unit includes the light emitting portion, the light guide member being a condensing lens, and an image sensor of a CMOS type.

The home position is displaced from the area below the platen glass in a sub scanning direction. While the scanning unit moves from the home position to the area below the platen glass, the moving speed of the scanning unit is stabilized.

Accordingly, the unit driving portion needs to position the scanning unit to the home position before the static document sheet reading process is executed.

There is known, for example, a configuration where a mark representing the home position is formed on a reference plate for shading correction, and upon detecting the mark from the line image data, the data processing portion detects that the scanning unit has reached the home position, wherein the reference plate is disposed adjacent to the platen glass.

SUMMARY

An image reading device according to an aspect of the present disclosure includes a platen glass, an outer periphery member, a scanning unit, a unit driving portion, an image sensor, and an image processing portion. A document sheet is placed on the platen glass. The outer periphery member is disposed at an outer periphery of the platen glass. The scanning unit includes a light emitting portion and a light guide member that are formed along a main scanning direction, and moves below the platen glass along a sub scanning direction that is perpendicular to the main scanning direction. The unit driving portion moves the scanning unit in a first direction or in a second direction, the first direction being along the sub scanning direction, the second direction being opposite to the first direction. The image sensor receives light guided by the light guide member and outputs a line image signal that represents an amount of received light. The image processing portion processes line image data that includes a plurality of pieces of pixel data corresponding to the line image signal. The outer peripheral member includes a first reference surface and a second reference surface. The first reference surface is a lower surface of an area that extends along a side edge portion of the platen glass at an end in the main scanning direction. The second reference surface is located adjacent to the first reference surface in the second direction and differs in light reflectance from the first reference surface. The image processing portion executes a border determination process to determine whether or not one or more pieces of outer periphery pixel data satisfy a predetermined border condition. The one or more pieces of outer periphery pixel data are one or more pieces of pixel data of an outer periphery area corresponding to the first reference surface or the second reference surface in the line image data acquired successively while the scanning unit is moving from one of an area of the first reference surface and an area of the second reference surface to the other in the sub scanning direction. The unit driving portion positions the scanning unit to a home position by causing the scanning unit to move a predetermined distance in the second direction from a position at which the scanning unit is located when the image processing portion determines that the one or more pieces of outer periphery pixel data satisfy the predetermined border condition, and causing the scanning unit to stop.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

FIRST EMBODIMENT: CONFIGURATION OF IMAGE READING DEVICE 1

An image reading device 1 according to a first embodiment executes an image reading process to read an image from a document sheet 9. For example, the image reading device 1 may be configured as a part of an image processing apparatus such as a copier, a facsimile apparatus, or a multifunction peripheral.

In the following description, the image read from the document sheet 9 in the image reading process by the image reading device 1 is referred to as a read image.

Figure 1:
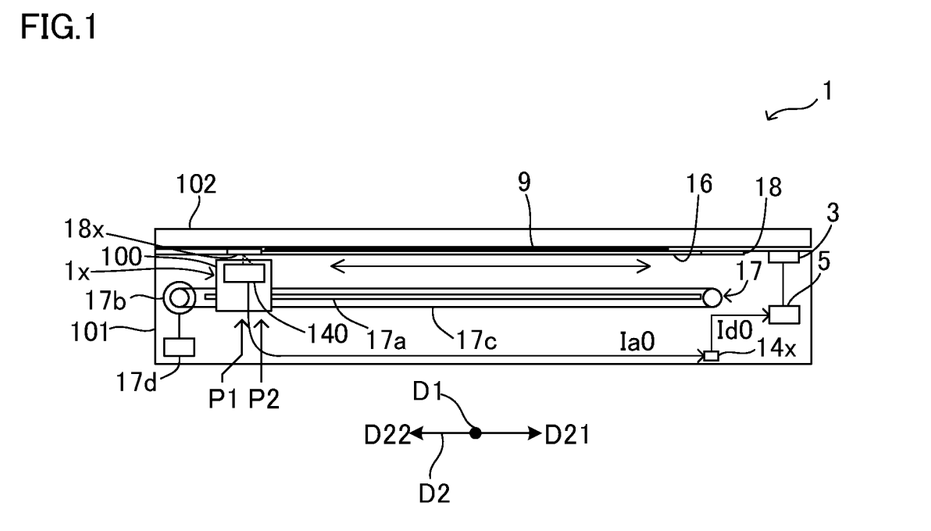
FIG. 1 is a configuration diagram of an image reading device according to a first embodiment.

In the present embodiment, the image reading device 1 includes a main body 101, a document sheet cover 102, a scanning unit 1x, an AFE (Analog Front End) 14x, a platen glass 16, and a moving mechanism 17 (see FIG. 1).

The image reading device 1 further includes a user interface device 3 and a data processing device 5.

The longitudinal direction of the scanning unit 1x matches a main scanning direction D1. The scanning unit 1x includes a CIS (Contact Image Sensor) unit 140 and a carriage 100 that supports the CIS unit 140.

In FIG. 1, a direction toward the depth direction of the paper surface is the main scanning direction D1, and a direction toward the right and left of the paper surface is a sub scanning direction D2. The sub scanning direction D2 is perpendicular to the main scanning direction D1.

The main body 101 is a housing storing the scanning unit 1x and the moving mechanism 17. The platen glass 16 is disposed at an upper surface of the main body 101.

The moving mechanism 17 moves the scanning unit 1x in the sub scanning direction D2 in an area below the platen glass 16 and a white reference surface 18x that is described below. The moving mechanism 17 includes a unit support portion 17a, a motor 17b, a power transmission mechanism 17c, and a motor driving circuit 17d.

The unit support portion 17a supports the scanning unit 1x so that the scanning unit 1x can move in the sub scanning direction D2 in the area below the platen glass 16 and the white reference surface 18x. The motor 17b is a drive source of a mechanism that moves the scanning unit 1x. The power transmission mechanism 17c converts a rotational force of the motor 17b into a force along the sub scanning direction D2 and transmits the force to the scanning unit 1x.

When the motor 17b rotates in a first rotation direction, the scanning unit 1x moves in a first direction D21 along the sub scanning direction D2. When the motor 17b rotates in a second rotation direction, the scanning unit 1x moves in a second direction D22 that is opposite to the first direction D21.

The motor driving circuit 17d causes the scanning unit 1x to move a specified moving distance in the first direction D21 or the second direction D22 by controlling the direction and amount of rotation of the motor 17b in accordance with a control command from the data processing device 5. The motor driving circuit 17d is an example of a motor control portion that controls the motor 17b.

Figure 2:
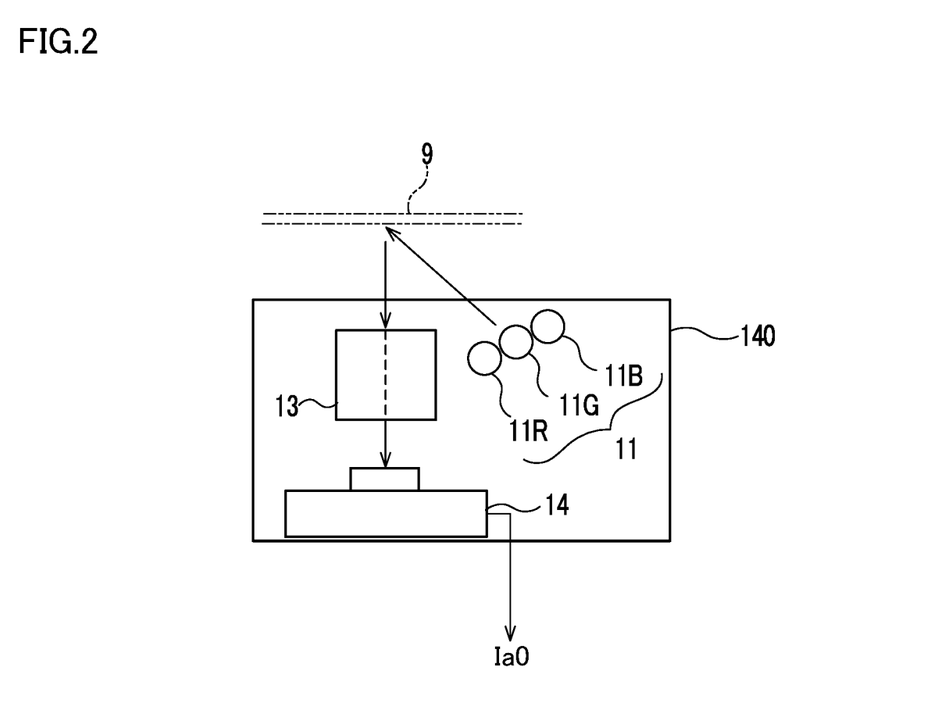
FIG. 2 is a configuration diagram of a CIS unit in the image reading device according to the first embodiment.

As shown in FIG. 2, the CIS unit 140 includes a light emitting portion 11, a lens 13, and an image sensor 14. The light emitting portion 11, the lens 13, and the image sensor 14 are formed to extend along the main scanning direction D1. That is, the longitudinal direction of each of the light emitting portion 11, the lens 13, and the image sensor 14 matches the main scanning direction D1.

The light emitting portion 11 emits light upward. Specifically, the light emitting portion 11 emits light toward the document sheet 9 placed on the platen glass 16.

The light emitted from the light emitting portion 11 reflects on the document sheet 9. For example, the light emitting portion 11 is an LED array that includes a plurality of LEDs arranged in alignment along the main scanning direction D1. In addition, the light emitting portion 11 may include a light source and a light guide glass that guides light from the light source in the main scanning direction D1, while causing the light to irradiate upward.

The lens 13 is a condensing lens that guides a reflection light of the light emitted from the light emitting portion 11, to the image sensor 14. The reflection light is light that has diffused and reflected on the document sheet 9 or the white reference surface 18x that is described below.

The image sensor 14 receives the reflection light and detects a light amount of the reflection light. Furthermore, the image sensor 14 outputs a line image signal Ia0 representing the detected light amount of the reflection light, to the AFE 14x.

In the present embodiment, the image sensor 14 is a line sensor of a CMOS type. The lens 13 is an example of a light guide member that guides the reflection light to the image sensor 14.

The AFE 14x converts analog line image signal Ia0 to digital line image data Id0, and outputs the line image data Id0 to the data processing device 5. The line image data Id0 includes a plurality of pieces of pixel data of one line in the main scanning direction D1.

The line image data Id0 of a plurality of lines corresponding to one page of the document sheet 9 is data of the read image corresponding to one page of the document sheet 9.

The image sensor 14 reads an image of the document sheet 9 as a color image. Accordingly, data of the read image is data of a color image representing the light amount of the reflection light for each of the colors, red, green, and blue.

In the present embodiment, the light emitting portion 11 includes a red light emitting portion 11R, a green light emitting portion 11G, and a blue light emitting portion 11B that respectively emit red light, green light, and blue light. In addition, the line image data Id0 of the three colors that is acquired when the red light emitting portion 11R, the green light emitting portion 11G, and the blue light emitting portion 11B emit light in sequence, constitutes the data of the read image.

The document sheet cover 102 is supported in such a way as to be opened and closed between a closing position for covering the upper surface of the platen glass 16 and an opening position for opening the upper surface of the platen glass 16.

The image reading device 1 is configured to execute a static document sheet reading process. The static document sheet reading process is often called an image reading process of a flat bed system.

In the static document sheet reading process, the moving mechanism 17 moves the scanning unit 1x to read an image from the document sheet 9 placed on the platen glass 16.

Figure 3:
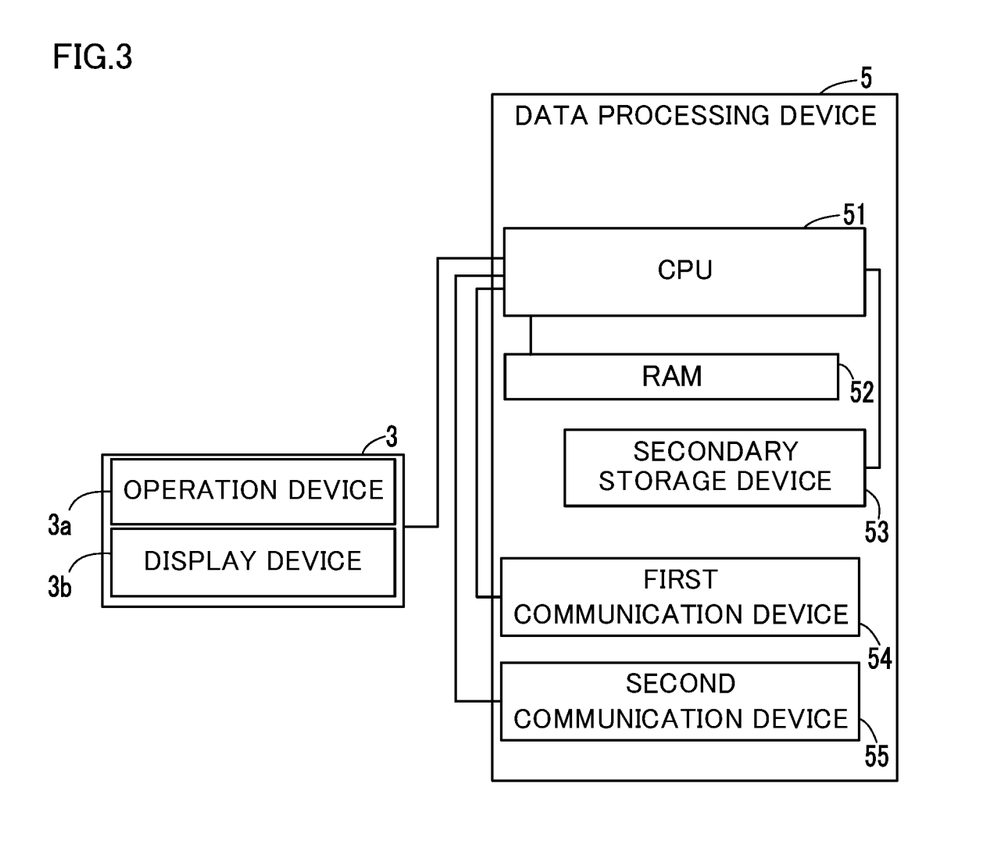
FIG. 3 is a block diagram showing a configuration of a user interface and a data processing device in the image reading device according to the first embodiment.

As shown in FIG. 3, the user interface device 3 includes an operation device 3a and a display device 3b. The operation device 3a is configured to receive human operations, and includes, for example, operation buttons and a touch panel.

The display device 3b includes a display panel such as a liquid crystal panel configured to display an image and other information. It is noted that the human operations include an operation by a human hand, as well as an operation by a human voice and an operation by human line of sight.

The data processing device 5 includes a CPU (Central Processing Unit) 51, a RAM 52, a secondary storage device 53, a first communication device 54, and a second communication device 55.

The secondary storage device 53 is a computer-readable, nonvolatile storage device. The secondary storage device 53 is configured to store computer programs and various types of data. For example, either or both of an SSD (Solid State Drive) and a hard disk drive are adopted as the secondary storage device 53.

The CPU 51 is a processor configured to perform various types of data processing and control by executing the computer programs stored in the secondary storage device 53. It is noted that another processor, such as the DSP, may perform the data processing and control in place of the CPU 51.

The RAM 52 is a computer-readable volatile storage device. The RAM 52 is accessed by the CPU 51. The RAM 52 primarily stores: data that is a target of processing executed by the CPU 51; and data that is generated by the CPU 51. The RAM 52 has a faster data access speed than the secondary storage device 53.

The CPU 51 is configured to communicate with a host apparatus (not shown) that is an external apparatus, via a network such as a LAN (Local Area Network). The host apparatus is a computer configured to communicate with the image reading device 1.

The first communication device 54 is an interface device configured to relay a signal transmission or a data communication performed between the CPU 51 and another device included in the image reading device 1. For example, the CPU 51 transmits a control command to the motor driving circuit 17d via the first communication device 54. In addition, the CPU 51 acquires the line image data Id0 from the AFE 14x via the first communication device 54.

The second communication device 55 is a communication interface device configured to perform a communication with the host apparatus via the network. The CPU 51 performs data transmission and reception with the host apparatus all via the second communication device 55.

For example, the CPU 51 transmits data of the read image acquired by the image reading process, to the host apparatus via the second communication device 55.

The CPU 51 includes a plurality of processing modules that are realized by the execution of the computer programs. The plurality of processing modules include a main control portion 5a, a reading control portion 5b, and an image processing portion 5c (see FIG. 4).

Figure 4:
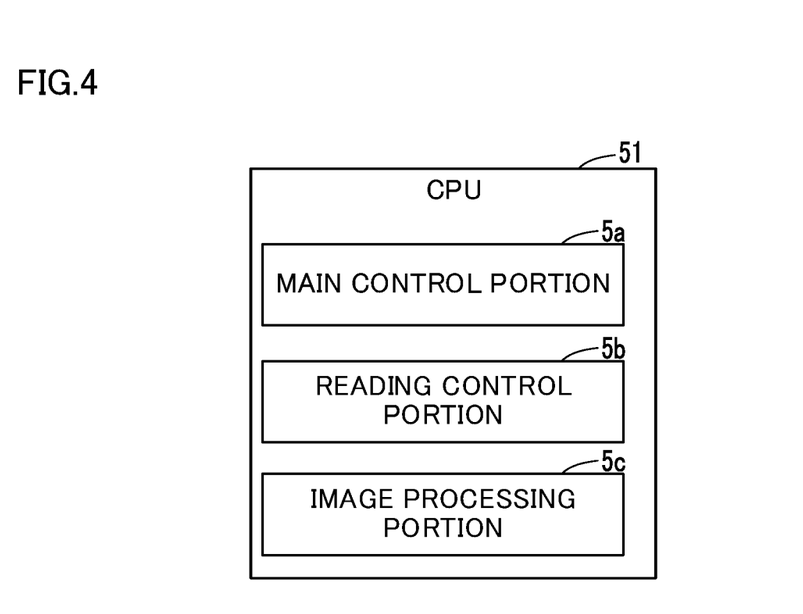
FIG. 4 is a block diagram showing a configuration of a processing module in a CPU of the image reading device according to the first embodiment.

The main control portion 5a monitors mainly operations performed on the operation device 3a and data receptions performed by the second communication device 55, and upon detection of an operation or a data reception, performs a control to start a process in accordance with the detected operation or data reception.

The reading control portion 5b causes the image reading device 1 to execute the image reading process by controlling an ADF 15, the motor driving circuit 17d, and the CIS unit 140. The image processing portion 5c executes various types of processes on the line image data Id0 that is acquired in the image reading process. The image processing portion 5c is an example of a data processing portion that processes the line image data Id0 including a plurality of pieces of pixel data corresponding to the line image signal Ia0.

The reading control portion 5b controls the motor driving circuit 17d to move and stop the scanning unit 1x at a predetermined home position P1. The home position P1 is an initial position of the scanning unit 1x, and is located on the second direction D22 side with respect to the platen glass 16.

The reading control portion 5b executes a static document sheet reading control upon detection of a predetermined scan start operation performed on the operation device 3a.

In the static document sheet reading control, the reading control portion 5b causes the moving mechanism 17 and the CIS unit 140 to execute the static document sheet reading process.

In the static document sheet reading control, the reading control portion 5b controls the motor driving circuit 17d to move the scanning unit 1x from the home position P1 in the first direction D21. Furthermore, when the scanning unit 1x is moving below the platen glass 16, the reading control portion 5b causes the CIS unit 140 to execute the image reading process.

Figure 5:
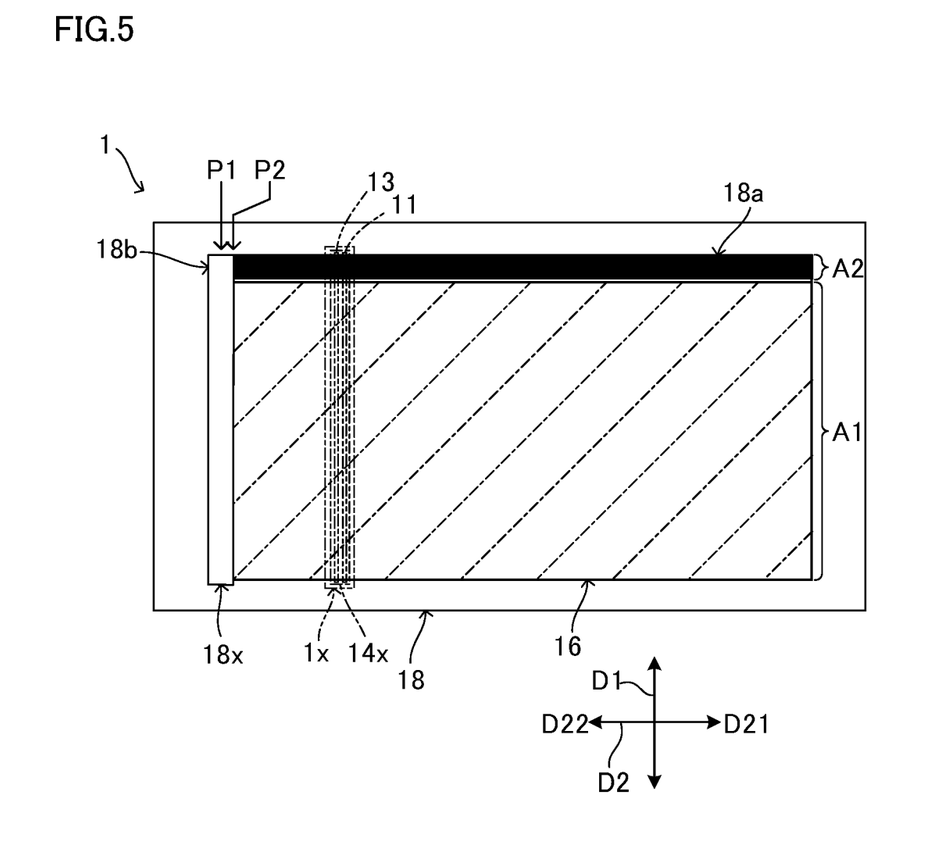
FIG. 5 is a bottom diagram of a main body top plate portion in the image reading device according to the first embodiment.

The image reading device 1 includes an outer periphery member 18 disposed at the outer periphery of the platen glass 16 (see FIG. 1, FIG. 5).

The outer periphery member 18 includes the uniform white reference surface 18x that is a lower surface of an area of the outer periphery member 18 located adjacent to the platen glass 16 in the second direction D22 (see FIG. 1, FIG. 5). The white reference surface 18x is a lower surface of a portion of the outer periphery member 18 located adjacent to the platen glass 16 in the second direction D22.

The white reference surface 18x is a uniformly colored surface having a high diffuse reflectance. For example, the white reference surface 18x is a uniform white surface.

The image processing portion 5c of the CPU 51 performs a shading correction by using a piece of line image data Id0 that is acquired when the scanning unit 1x faces the white reference surface 18x. The shading correction is a process to set a correction coefficient for the line image data Id0.

In the present embodiment, the scanning unit 1x faces the white reference surface 18x when the scanning unit 1x is located at the home position P1. The reading control portion 5b moves the scanning unit 1x from the home position P1 in the first direction D21, and at a timing when the scanning unit 1x has moved a predetermined run-up distance, causes the CIS unit 140 to start the image reading process.

The run-up distance is a distance between the home position P1 and a position corresponding to an edge of the document sheet 9 placed on the platen glass 16. While the scanning unit 1x moves the run-up distance from the home position P1, the moving speed of the scanning unit 1x is stabilized.

The reading control portion 5b causes the scanning unit 1x to move in the first direction D21 a distance that is a total of the run-up distance and a length of the document sheet 9 placed on the platen glass 16. Thereafter, the reading control portion 5b causes the CIS unit 140 to end the image reading process, and causes the scanning unit 1x to move in the second direction D22 to the home position P1.

In the following description, a portion of the outer periphery member 18 on which the white reference surface 18x is formed, is referred to as a reference plate.

Meanwhile, as a reference example, a mark representing the home position P1 may be formed on the reference plate for shading correction, wherein the reference plate is located adjacent to the platen glass 16. In the reference example, upon detecting the mark from the line image data Id0, the image processing portion 5c detects that the scanning unit 1x has reached the home position P1.

On the other hand, it is desired that the shading correction is performed in a state where the scanning unit 1x is located at the home position P1, or performed while the scanning unit 1x is moving from the home position P1 toward the area below the platen glass 16. This makes it possible to perform the shading correction efficiently when the static document sheet reading process is executed.

In the present embodiment, the image processing portion 5c performs the shading correction by using the line image data Id0 that is acquired while the scanning unit 1x is moving the run-up distance from the home position P1 in the first direction D21.

Accordingly, in a case where the mark representing the home position P1 is formed on the reference plate, the home position P1 is set to a position that is separated in the second direction D22 from the platen glass 16 more than the white area for shading correction in the reference plate is. This increases the time between the start of movement of the scanning unit 1x from the home position P1 and the start of reading an image from the document sheet 9 on the platen glass 16, thereby increasing the processing time of the static document sheet reading process.

In addition, due to the increase in number of parts, it is not preferable to have a dedicated sensor to detect the scanning unit 1x that has reached the home position P1.

The following describes a configuration for positioning the scanning unit 1x to the home position P1 in the image reading device 1.

FIG. 5 is a bottom diagram of a main body top plate portion that includes the platen glass 16 and the outer periphery member 18.

As shown in FIG. 5, the outer periphery member 18 includes a first reference surface 18a and a second reference surface 18b. The first reference surface 18a is a lower surface of an area that extends along a side edge portion of the platen glass 16 at an end in the main scanning direction D1. The second reference surface 18b is a surface located adjacent to the first reference surface 18a in the second direction D22.

The second reference surface 18b differs in light diffuse reflectance from the first reference surface 18a. In the present embodiment, the second reference surface 18b has a higher light diffuse reflectance than the first reference surface 18a. In other words, the first reference surface 18a has a lower light diffuse reflectance than the second reference surface 18b.

For example, one of the first reference surface 18a and the second reference surface 18b may be a black surface, and the other may be a white surface. In this way, it is desirable that the first reference surface 18a and the second reference surface 18b have a large difference in light diffuse reflectance.

In addition, as shown in FIG. 5, it is desirable that a border line between the first reference surface 18a and the second reference surface 18b is a straight line along the main scanning direction D1.

In the following description, an area in which the image of the document sheet 9 is read in the main scanning direction D1 is referred to as a reading target area A1, and an area occupied by the first reference surface 18a or the second reference surface 18b in the main scanning direction D1 is referred to as an outer periphery area A2 (see FIG. 5).

In the present embodiment, the white reference surface 18x is a uniform surface extending along the platen glass 16 and the total length of the reading target area A1 and the outer periphery area A2 in the main scanning direction D1. In addition, a portion of the white reference surface 18x corresponding to the outer periphery area A2 is the second reference surface 18b. Accordingly, the second reference surface 18b is a white surface. In this case, it is preferable that the first reference surface 18a is a black surface.

The light emitting portion 11, the lens 13, and the image sensor 14 are formed to extend along the length of the reading target area A1 and the outer periphery area A2 in the main scanning direction D1. In the present embodiment, the light emitting portion 11 and the lens 13 are disposed in such a way as to extend out, with respect to the platen glass 16, longer toward the outer periphery area A2 than toward the opposite side in the main scanning direction D1 (see FIG. 5). It is noted that the image sensor 14 is disposed in a similar manner.

The image sensor 14 outputs the line image signal Ia0 corresponding to the reading target area A1 and the outer periphery area A2. In addition, the line image data Id0 includes a plurality of pieces of pixel data of the reading target area A1, and one or more pieces of pixel data of the outer periphery area A2.

The moving range of the scanning unit 1x in the second direction D22 is limited to a range where the scanning unit 1x faces the white reference surface 18x. Furthermore, the moving range of the scanning unit 1x in the first direction D21 is limited to a range where the scanning unit 1x faces the platen glass 16 and the first reference surface 18a. That is, the moving range of the scanning unit 1x is limited to a range where the scanning unit 1x faces at least one of the first reference surface 18a and the second reference surface 18b.

[Home Return Control]

Next, an example of the procedure of a home return control is described with reference to the flowchart shown in FIG. 6.

The reading control portion 5b and the image processing portion 5c execute the home return control upon occurrence of a predetermined return start event. In the home return control, the scanning unit 1x is moved to the home position P1.

The return start event occurs when the image reading device 1 is started, when a movement of the scanning unit 1x in the first direction D21 ends in the static document sheet reading process, or when a conveyed document sheet reading process ends.

In the following description, S1, S2, . . . are identification signs representing a plurality of steps of the home return control. In the home return control, first the reading control portion 5b starts the process of step S1.

<Step S1>

In step S1, the reading control portion 5b causes the light emitting portion 11 and the image sensor 14 to execute the line image reading process, and the image processing portion 5c acquires, from the AFE 14x, the line image data Id0 that is acquired in the line image reading process.

In the line image reading process, the reading control portion 5b causes the light emitting portion 11 to emit light, and causes the image sensor 14 to operate. For example, in the line image reading process, the reading control portion 5b causes one or more of the red light emitting portion 11R, the green light emitting portion 11G, and the blue light emitting portion 11B to emit light.

Furthermore, in step S1, the image processing portion 5c determines whether or not an outer periphery pixel value is higher than a predetermined threshold value, wherein the outer periphery pixel value is a value of outer periphery pixel data. The outer periphery pixel data is the one or more pieces of pixel data of the outer periphery area A2 in the line image data Id0 acquired in the line image reading process.

In a case where the line image data Id0 includes a plurality of pieces of outer periphery pixel data, the outer periphery pixel value is a representative value of the plurality of pieces of outer periphery pixel data. For example, the representative value is an average value or a maximum value.

Upon determining that the outer periphery pixel value is higher than the threshold value, the image processing portion 5c moves the process to step S2. Otherwise, the image processing portion 5c moves the process to step S5.

When the outer periphery pixel value is higher than the threshold value, the scanning unit 1x is located to face the second reference surface 18b, and when the outer periphery pixel value is lower than the threshold value, the scanning unit 1x is located to face the first reference surface 18a.

That is, the image processing portion 5c determines which of the first reference surface 18a or the second reference surface 18b the scanning unit 1x is located to face, by comparing the outer periphery pixel value with the predetermined threshold value.

<step S2>

In step S2, the reading control portion 5b causes the image sensor 14 to execute the line image reading process successively while causing the scanning unit 1x to move in the first direction D21. Furthermore, the image processing portion 5c executes the process of step S3 while the scanning unit 1x is moving.

<Step S3>

In step S3, the image processing portion 5c determines, for each of a plurality of pieces of line image data Id0 that are acquired successively while the scanning unit 1x is moving in the first direction D21, whether or not the outer periphery pixel value is equal to or lower than the threshold value.

The process of step S3 is repeated until it is determined that the outer periphery pixel value is equal to or lower than the threshold value. When it is determined that the outer periphery pixel value is equal to or lower than the threshold value, the scanning unit 1x has moved to a position where it faces the first reference surface 18a.

Upon determining that the outer periphery pixel value is equal to or lower than the threshold value, the image processing portion 5c moves the process to step S4.

When it is determined in step S3 that the outer periphery pixel value is equal to or lower than the threshold value, the scanning unit 1x is located at a border position P2 where it faces a border between the first reference surface 18a and the second reference surface 18b (see FIG. 5).

<Step S4>

In step S4, the reading control portion 5b causes the scanning unit 1x to move a first specific distance in the first direction D21 from a position at which the scanning unit 1x is located when it is determined that the outer periphery pixel value is equal to or lower than the threshold value, and stops the scanning unit 1x. Thereafter, the reading control portion 5b moves the process to step S5.

The process of step S4 causes the scanning unit 1x to stop at a position that is separated by the first specific distance from the border position P2 in the first direction D21.

<Step S5>

In step S5, the reading control portion 5b causes the image sensor 14 to execute the line image reading process successively while causing the scanning unit 1x to move in the second direction D22. Furthermore, the image processing portion 5c executes the process of step S6 while the scanning unit 1x is moving.

<Step S6>

In step S6, the image processing portion 5c determines, for each of a plurality of pieces of line image data Id0 that are acquired successively while the scanning unit 1x is moving in the second direction D22, whether or not the outer periphery pixel value is higher than the threshold value.

The process of step S6 is repeated until it is determined that the outer periphery pixel value is higher than the threshold value. When it is determined that the outer periphery pixel value is higher than the threshold value, the scanning unit 1x is passing the border position P2.

Upon determining that the outer periphery pixel value is higher than the threshold value, the image processing portion 5c moves the process to step S7.

<Step S7>

In step S7, the reading control portion 5b causes the scanning unit 1x to move a second specific distance in the second direction D22 from a position at which the scanning unit 1x is located when it is determined that the outer periphery pixel value is higher than the threshold value, and causes the scanning unit 1x to stop. The process of step S7 causes the scanning unit 1x to stop at the home position P1. Thereafter, the reading control portion 5b ends the home return control.

As described above, the image processing portion 5c executes the process of step S6 while the scanning unit 1x is moving in the sub scanning direction D2 from an area corresponding to the first reference surface 18a to an area corresponding to the second reference surface 18b. That is, the image processing portion 5c executes the process of step S6 while the scanning unit 1x is moving in the second direction D22.

The process of step S6 is a border determination process to determine whether or not the outer periphery pixel data satisfies a predetermined border condition, the outer periphery pixel data being the one or more pieces of outer periphery pixel data of the outer periphery area A2 in a plurality of pieces of line image data Id0 that are acquired successively while the scanning unit 1x is moving.

In the present embodiment, the border condition is a condition that the outer periphery pixel value is higher than the threshold value.

In addition, in step S7, the reading control portion 5b and the moving mechanism 17 controlled by the reading control portion 5b position the scanning unit 1x to the home position P1 by moving the scanning unit 1x by a predetermined distance in the second direction D22 from a position at which the scanning unit 1x is located when it is determined that the outer periphery pixel data satisfies the border condition, and stopping the scanning unit 1x.

In steps S6 and S7, when it is determined that the outer periphery pixel data satisfies the border condition, the reading control portion 5b and the moving mechanism 17 cause the scanning unit 1x to move to the home position P1 without stopping.

The reading control portion 5b and the moving mechanism 17 that is controlled by the reading control portion 5b, constitute an example of a unit driving portion that causes the scanning unit 1x to move in the first direction D21 or the second direction D22 along the sub scanning direction D2.

With the adoption of the image reading device 1, it is possible, with a simple configuration, to position the scanning unit 1x to the home position P1.

In addition, as described above, the moving range of the scanning unit 1x is limited to a range where the scanning unit 1x faces at least one of the first reference surface 18a and the second reference surface 18b.

Accordingly, the image processing portion 5c can easily determine which of the first reference surface 18a or the second reference surface 18b the scanning unit 1x is located to face, by comparing the outer periphery pixel value with the threshold value.

In the present embodiment, the motor 17b is a stepping motor, and the motor driving circuit 17d controls the rotation amount of the motor 17b by outputting a control pulse signal to the motor 17b.

The control pulse signal is an example of a rotation pulse signal that is output each time the motor 17b rotates by a predetermined unit rotation amount. The motor driving circuit 17d is an example of a pulse output circuit that outputs the rotation pulse signal.

In the present embodiment, a timing control circuit (not shown) outputs, in synchronization with the control pulse signal, a line synchronization signal to the image sensor 14. This allows the image sensor 14 to output the line image signal Ia0 in synchronization with the line synchronization signal. That is, the image sensor 14 outputs the line image signal Ia0 at a timing synchronized with the control pulse signal.

In addition, in steps S4 and S7, the motor driving circuit 17d stops the scanning unit 1x when a predetermined target number of control pulse signals have been output since an output of a control pulse signal corresponding to a piece of outer periphery pixel data that was determined to satisfy the border condition.

The target number in step S4 is the number of control pulse signals corresponding to the first specific distance. The target number in step S7 is the number of control pulse signals corresponding to the second specific distance.

With the configuration where the line synchronization signal is output in synchronization with the control pulse signal, it is possible to position the scanning unit 1x to a target position with high accuracy in the home return control even in a case where the moving speed of the scanning unit 1x is unstable.

It is noted that in a case where the line synchronization signal is not output in synchronization with the control pulse signal, the motor driving circuit 17d causes the scanning unit 1x to move the first specific distance or the second specific distance by controlling the time period for which the scanning unit 1x moves.

SECOND EMBODIMENT

Next, an image reading device 1A according to a second embodiment is described with reference to FIG. 7 and FIG. 8. The following describes only differences of the image reading device 1A from the image reading device 1.

Compared with the image reading device 1, the image reading device 1A additionally includes an ADF (Automatic Documents Feeder) 15 and a contact glass 16a, and includes a white reference surface 18y in place of the white reference surface 18x.

Figure 8:
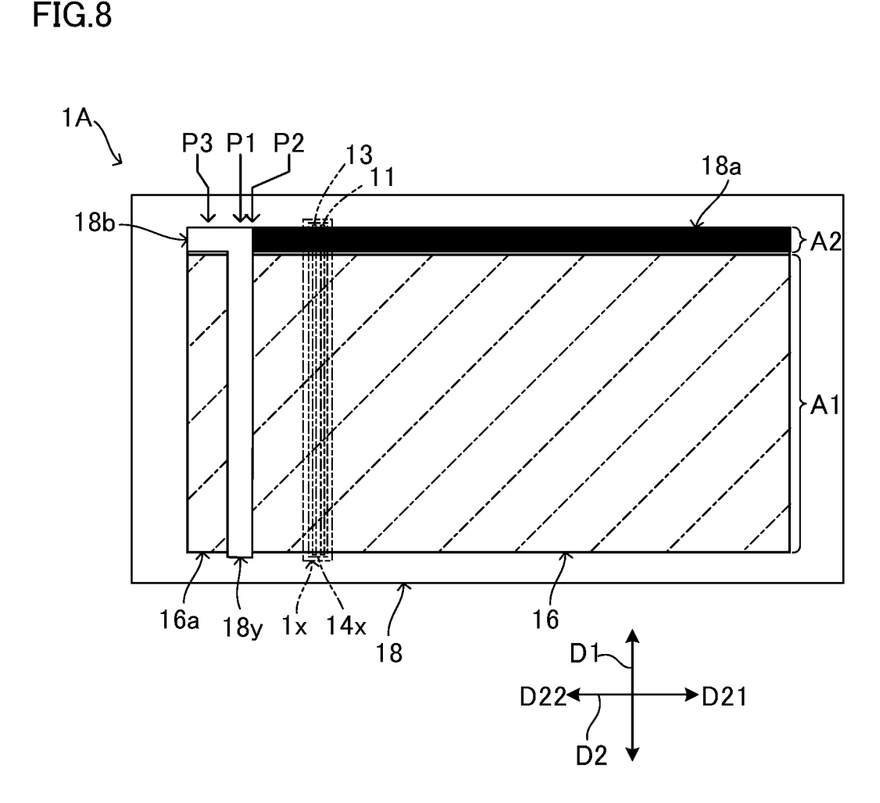
FIG. 8 is a bottom diagram of a main body top plate portion in the image reading device according to the second embodiment.

FIG. 8 is a bottom diagram of a main body top plate portion that includes the platen glass 16, the contact glass 16a, and the outer periphery member 18.

The contact glass 16a is disposed in the reading target area A1 of the upper surface of the main body 101 to be adjacent to the white reference surface 18y in the second direction D22. The longitudinal direction of the contact glass 16a matches the main scanning direction D1 (see FIG. 8).

The document sheet cover 102 is supported in such a way as to be opened and closed between a closing position for covering the upper surfaces of the platen glass 16 and the contact glass 16a, and an opening position for opening the upper surfaces of the platen glass 16 and the contact glass 16a.

The moving mechanism 17 causes the scanning unit 1x to move in the sub scanning direction D2 in an area below the platen glass 16 and the contact glass 16a. In the present embodiment, the light emitting portion 11 emits light toward the document sheet 9 placed on the platen glass 16, or toward the document sheet 9 that passes over the contact glass 16a.

The ADF 15 is built in the document sheet cover 102. In addition, a conveyance path 150 of the document sheet 9 is formed in the document sheet cover 102. The conveyance path 150 is a path along which the document sheet 9 moves from a document sheet tray 151, passes over the contact glass 16a, and reaches a discharge tray 152.

The ADF 15 conveys, one by one along the conveyance path 150, a plurality of document sheets 9 placed on the document sheet tray 151, and discharges the document sheets 9 from the conveyance path 150 to the discharge tray 152.

The image reading device 1A is configured to selectively execute the static document sheet reading process or the conveyed document sheet reading process. The conveyed document sheet reading process is often called an image reading process of a document sheet feed system.

In the conveyed document sheet reading process, an image is read from the document sheet 9 conveyed by the ADF 15 in a state where the scanning unit 1x is held at a static reading position P3 to face the contact glass 16a.

In the present embodiment, the home position P1 is located between the platen glass 16 and the contact glass 16a in the sub scanning direction D2.

The reading control portion 5b executes a conveyed document sheet reading control or the static document sheet reading control when the scan start operation performed on the operation device 3a is detected. The reading control portion 5b executes the conveyed document sheet reading control in a case where a document sheet sensor (not shown) detects the document sheet 9 on the document sheet tray 151. Otherwise, the reading control portion 5b executes the static document sheet reading control.

In the conveyed document sheet reading control, the reading control portion 5b controls the motor driving circuit 17d to move the scanning unit 1x from the home position P1 to the static reading position P3 and then stop the scanning unit 1x. Furthermore, the reading control portion 5b causes the ADF 15 to feed the documents 9 one by one and causes the CIS unit 140 to execute the image reading process until the document sheet sensor does not detect the document 9 on the document sheet tray 151.

In the image reading process, a process is repeated in which the light emitting portion 11 emits light and the image sensor 14 detects the light amount of the reflection light and outputs the line image signal Ia0.

Figure 7:
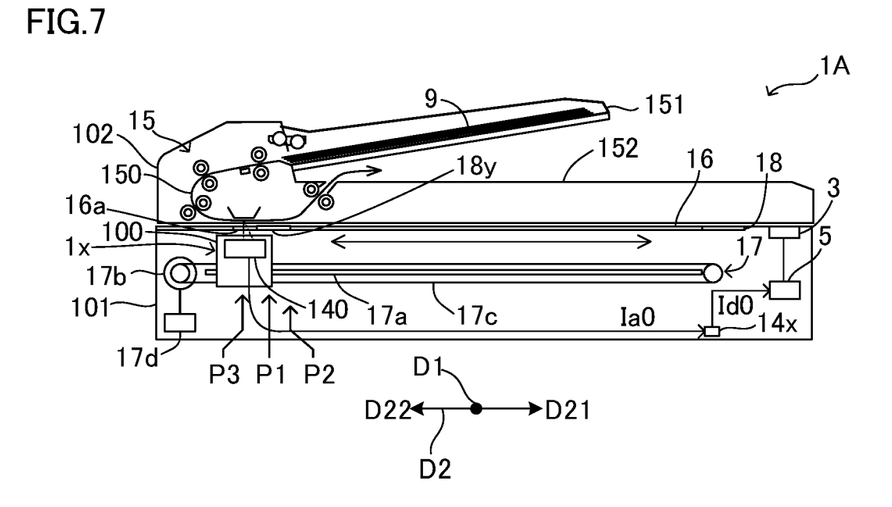
FIG. 7 is a configuration diagram of an image reading device according to a second embodiment.

In the image reading device 1A, the outer periphery member 18 is disposed at the outer periphery of the platen glass 16 and the contact glass 16a (see FIG. 7, FIG. 8). A lower surface of a portion of the outer periphery member 18 between the platen glass 16 and the contact glass 16a, is the white reference surface 18y.

As is the case with the white reference surface 18x, the white reference surface 18y includes a lower surface of a portion of the outer periphery member 18 between the platen glass 16 and the contact glass 16a. Furthermore, the white reference surface 18y is formed to continue from an area between the platen glass 16 and the contact glass 16a to an area that extends along a side edge portion of the contact glass 16a at an end in the main scanning direction D1 in the outer periphery area A2 of the lower surface of the outer periphery member 18.

In other words, the white reference surface 18y is formed in the shape of a letter L that is curved from the area between the platen glass 16 and the contact glass 16a to the area in the outer periphery area A2 adjacent to the contact glass 16a.

In the present embodiment, the moving range of the scanning unit 1x in the second direction D22 is limited to a range where the scanning unit 1x faces the contact glass 16a. Furthermore, the moving range of the scanning unit 1x in the first direction D21 is limited to a range where the scanning unit 1x faces the platen glass 16.

Accordingly, in the present embodiment, too, the moving range of the scanning unit 1x is limited to a range where the scanning unit 1x faces at least one of the first reference surface 18a and the second reference surface 18b. With the adoption of the image reading device 1A, a similar effect is obtained as in the case where the image reading device 1 is adopted.

FIRST APPLICATION EXAMPLE

Figure 9:
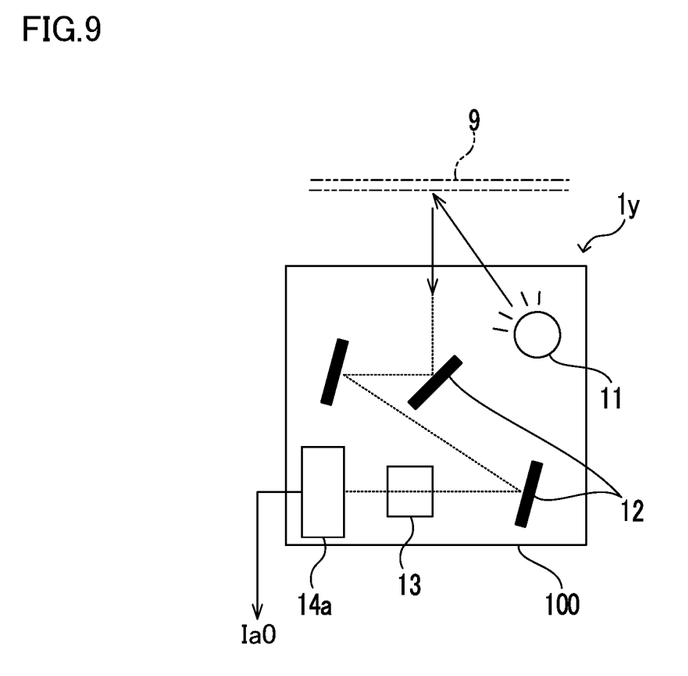
FIG. 9 is a configuration diagram of a scanning unit according to an application example of the image reading device according to an embodiment.

The following describes a first application example of the image reading device 1 with reference to FIG. 9.

In the image reading device according to the first application example, the scanning unit 1x of the image reading device 1 has been replaced with a scanning unit 1y shown in FIG. 9.

The scanning unit 1y includes the light emitting portion 11, one or more mirrors 12, the lens 13, an image sensor 14a, and a carriage 100. The carriage 100 supports the light emitting portion 11, the mirrors 12, the lens 13, and the image sensor 14a.

The mirrors 12 and the lens 13 are an example of a light guide member that guides the reflection light to the image sensor 14a. The image sensor 14a is a line sensor of a CCD (Charge Coupled Device) type.

As is the case with the image sensor 14, the image sensor 14a receives the light guided by the light guide member and outputs the line image signal Ia0 that represents an amount of the received light. With the adoption of the present application example, a similar effect is obtained as in the case where the image reading device 1 is adopted.

SECOND APPLICATION EXAMPLE

Next, a second application example of the image reading device 1 is described. The present application example is an application example of the first application example.

In the present application example, the carriage 100 is divided into a first carriage and a second carriage that have different moving speeds. The first carriage supports the light emitting portion 11 and a part of a plurality of mirrors 12, and the second carriage supports the remaining part of the plurality of mirrors 12.

In addition, the lens 13 and the image sensor 14a are fixed to the inside of the main body 101.

In addition, the mirrors 12 supported by the first carriage guide the light reflected on the document sheet 9 to the mirrors supported by the second carriage, and the mirrors supported by the second carriage guide the light to the lens 13 and the image sensor 14a fixed to the inside of the main body 101. With the adoption of the present application example, a similar effect is obtained as in the case where the first application example is adopted.

THIRD APPLICATION EXAMPLE

Next, a third application example of the image reading device 1 is described.

Figure 6:
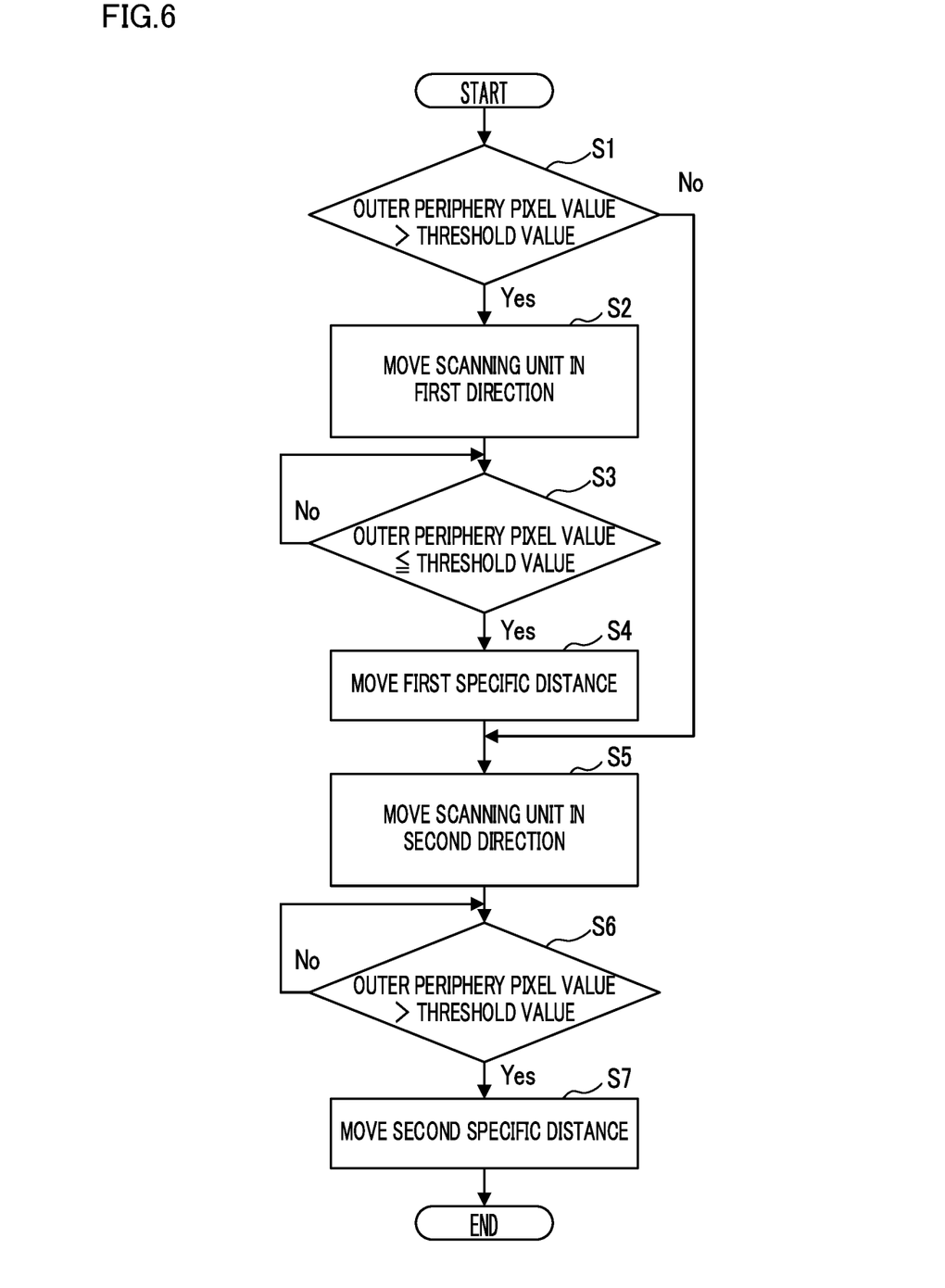
FIG. 6 is a flowchart showing an example of a procedure of a home return control in the image reading device according to the first embodiment.

In the present application example, in step S4 of FIG. 6, the reading control portion 5b and the moving mechanism 17 execute the process of step S7, and then ends the home return control. In this case, in step S3, the image processing portion 5c executes the border determination process while the scanning unit 1x is moving in the first direction D21. In step S3, the border condition is a condition that the outer periphery pixel value is equal to or higher than the threshold value.

Furthermore, the reading control portion 5b and the moving mechanism 17 reverse the moving direction of the scanning unit 1x in the process of step S7 that is executed in step S4.

Subsequently, the reading control portion 5b and the moving mechanism 17 cause the scanning unit 1x to move a predetermined distance in the second direction D22 from a position at which the scanning unit 1x is located when it is determined in step S3 that the outer periphery pixel data satisfies the border condition, and cause the scanning unit 1x to stop.

With the adoption of the present application example, a similar effect is obtained as in the case where the image reading device 1 is adopted.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:
1. An image reading device comprising:
a platen glass on which a document sheet is placed;
an outer periphery member disposed at an outer periphery of the platen glass;
a scanning unit including a light emitting portion and a light guide member that are formed along a main scanning direction, and configured to move along a sub scanning direction below the platen glass, the sub scanning direction being perpendicular to the main scanning direction;
a unit driving portion configured to move the scanning unit in a first direction or in a second direction, the first direction being along the sub scanning direction, the second direction being opposite to the first direction;

an image sensor configured to receive light guided by the light guide member and output a line image signal that represents an amount of received light; and an image processing portion configured to process line image data that includes a plurality of pieces of pixel data corresponding to the line image signal, wherein the outer peripheral member includes a first reference surface and a second reference surface, the first reference surface is a lower surface of an area that extends along a side edge portion of the platen glass at an end in the main scanning direction, the second reference surface is located adjacent to the first reference surface in the second direction and differs in light reflectance from the first reference surface, the image processing portion executes a border determination process to determine whether or not one or more pieces of outer periphery pixel data satisfy a predetermined border condition, the one or more pieces of outer periphery pixel data are one or more pieces of pixel data of an outer periphery area corresponding to the first reference surface or the second reference surface in the line image data acquired successively while the scanning unit is moving from one of an area of the first reference surface and an area of the second reference surface to the other in the sub scanning direction, and the unit driving portion positions the scanning unit to a home position by causing the scanning unit to move a predetermined distance in the second direction from a position at which the scanning unit is located when the image processing portion determines that the one or more pieces of outer periphery pixel data satisfy the predetermined border condition, and causing the scanning unit to stop.

2. The image reading device according to claim 1, wherein the unit driving portion includes:
  a motor that is a drive source;
  a pulse output circuit configured to output a rotation pulse signal each time the motor rotates by a predetermined unit rotation amount; and
  a motor control portion configured to control the motor, wherein the image sensor outputs the line image signal at a timing synchronized with the rotation pulse signal, and the motor control portion stops the scanning unit when a predetermined number of rotation pulse signals have been output since an output of a rotation pulse signal corresponding to a piece of outer periphery pixel data that was determined to satisfy the border condition.

3. The image reading device according to claim 1, wherein the outer periphery member includes a uniform white reference surface that is a lower surface of an area of the outer periphery member located adjacent to the platen glass in the second direction, the white reference surface extending along a total length of an area along the platen glass and the outer periphery area in the main scanning direction, a portion of the white reference surface corresponding to the outer periphery area is the second reference surface, and the image processing portion performs a shading correction to set a correction coefficient for the line image data by using a piece of line image data that is acquired when the scanning unit faces the white reference surface.

4. The image reading device according to claim 1, wherein the light emitting portion and the light guide member are disposed in such a way as to extend out, with respect to the platen glass, longer toward the outer periphery area than toward a side opposite to the outer periphery area in the main scanning direction.

5. The image reading device according to claim 1, wherein a moving range of the scanning unit is limited to a range where the scanning unit faces at least one of the first reference surface and the second reference surface.

6. The image reading device according to claim 1, wherein the image processing portion executes the border determination process while the scanning unit is moving in the second direction, and when it is determined that the outer periphery pixel data satisfies the border condition, the unit driving portion causes the scanning unit to move to the home position without stopping.

7. The image reading device according to claim 1, wherein the scanning unit includes a contact image sensor unit that includes the light emitting portion, the light guide member being a condensing lens, and the image sensor of a CMOS type.

* * * * *